United States Patent [19]

Jeremiah et al.

[11] 4,234,955
[45] Nov. 18, 1980

[54] PARITY FOR COMPUTER SYSTEM HAVING AN ARRAY OF EXTERNAL REGISTERS

[75] Inventors: Thomas L. Jeremiah, Round Rock, Tex.; Karl F. Pezdirtz, Vestal, N.Y.

[73] Assignee: International Business Machines Corporation, Armonk, N.Y.

[21] Appl. No.: 6,712

[22] Filed: Jan. 26, 1979

[51] Int. Cl.³ .............................................. G06F 11/10
[52] U.S. Cl. ....................................... 371/51; 364/738
[58] Field of Search ............................... 235/306, 312; 340/146.1 AG; 364/738; 371/51

[56] References Cited

U.S. PATENT DOCUMENTS

| | | | |
|---|---|---|---|
| 3,342,983 | 9/1967 | Pitkowsky et al. | 364/738 |
| 3,585,378 | 5/1971 | Bouricius | 235/312 |
| 3,599,146 | 8/1971 | Wersbecker | 235/306 X |
| 3,789,204 | 1/1974 | Barlow | 235/312 |
| 3,986,015 | 10/1976 | Gooding et al. | 364/738 |
| 4,103,823 | 8/1978 | Aichelmann, Jr. et al. | 235/306 X |

*Primary Examiner*—David H. Malzahn
*Attorney, Agent, or Firm*—E. W. Galbi

[57] ABSTRACT

For a computer system having an array of external registers which may be used as a data source or data destination, wherein such system uses an odd parity checking system, and wherein certain of the register position in the external array can be vacant, an improved parity checking configuration includes a plurality of parity bit latches, one for each location in the external register array. The parity bit latches are set by an initial microprogram load to provide an odd parity bit for each location in the external array of registers which is empty or which may be faulty, disabled or malfunctioning. This assures that when the external array is searched by row, that all of the array locations will provide the appropriate parity check regardless of whether a byte of information exists therein or not.

15 Claims, 11 Drawing Figures

|   | 0 | 1 | 2 | 3 | 4 | 5 | 6 | 7 |
|---|---|---|---|---|---|---|---|---|
| 0 | SIR | INT 5 | ≡ | ✕ | ≡ | ←— | CHAN SAR | —→ |
| 1 | W1 | MNTR | ≡ | ✕ | ≡ | ≡ | ≡ | ≡ |
| 2 | W2 | INT 4 | ≡ | ✕ | ≡ | ≡ | ≡ | ≡ |
| 3 | PSN 0 | PSW 1 | ≡ | ✕ | ≡ | ≡ | ≡ | ≡ |
| 4 | ✕ | INT 3 | ≡ | ✕ | ✕ | ←— | I COUNTER | —→ |
| 5 | I CYCLE CONTROL | INT 2 | ≡ | ✕ | ≡ | ≡ | ≡ | ≡ |
| 6 | OP | INT 1 | RETRY | ✕ | ←— | TO D HI | —→ | ≡ |
| 7 | H REG | INT 0 | ✕ | ✕ | ≡ | ≡ | ≡ | ≡ |

FIG. 2

|   | 0 | 1 | 2 | 3 | 4 | 5 | 6 | 7 |
|---|---|---|---|---|---|---|---|---|
| 0 | CHAN EXT 0 | INT 5 | ≡ | ✕ | ≡ | ←— | CHAN SAR | —→ |
| 1 | CHAN N/EXT 1 | | ≡ | ✕ | ≡ | ≡ | ≡ | ≡ |
| 2 | CHAN N/EXT 2 | | ≡ | ✕ | ≡ | ≡ | ≡ | ≡ |
| 3 | CHAN N/EXT 3 | | ≡ | ✕ | ≡ | ≡ | ≡ | ≡ |
| 4 | CHAN N/EXT 4 | | ≡ | ✕ | ✕ | ←— | I COUNTER | —→ |
| 5 | CHAN N/EXT 5 | | ≡ | ✕ | ≡ | ≡ | ≡ | ≡ |
| 6 | CHAN N/EXT 6 | | RETRY | ✕ | ←— | TO D HI | —→ | ≡ |
| 7 | H REG | INT 0 | ✕ | ✕ | ≡ | ≡ | ≡ | ≡ |

FIG. 3

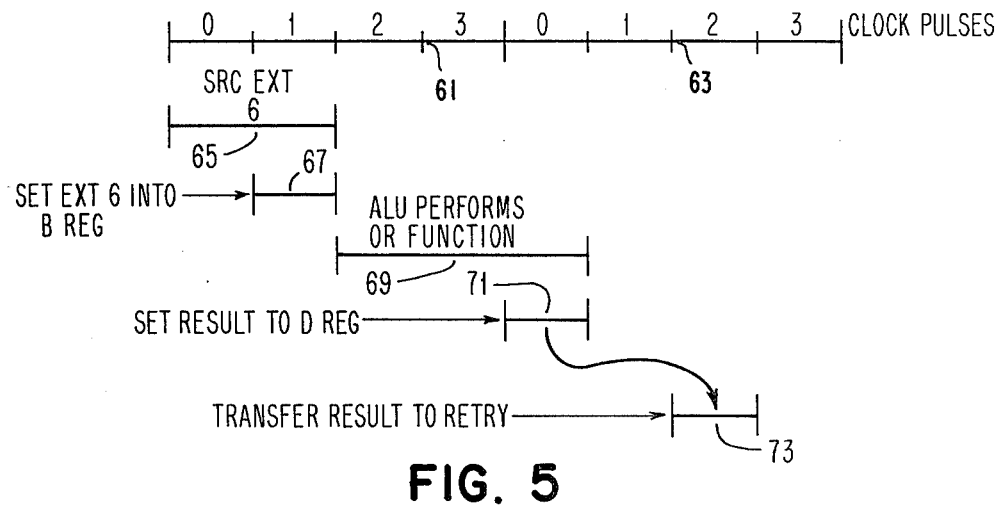
FIG. 5
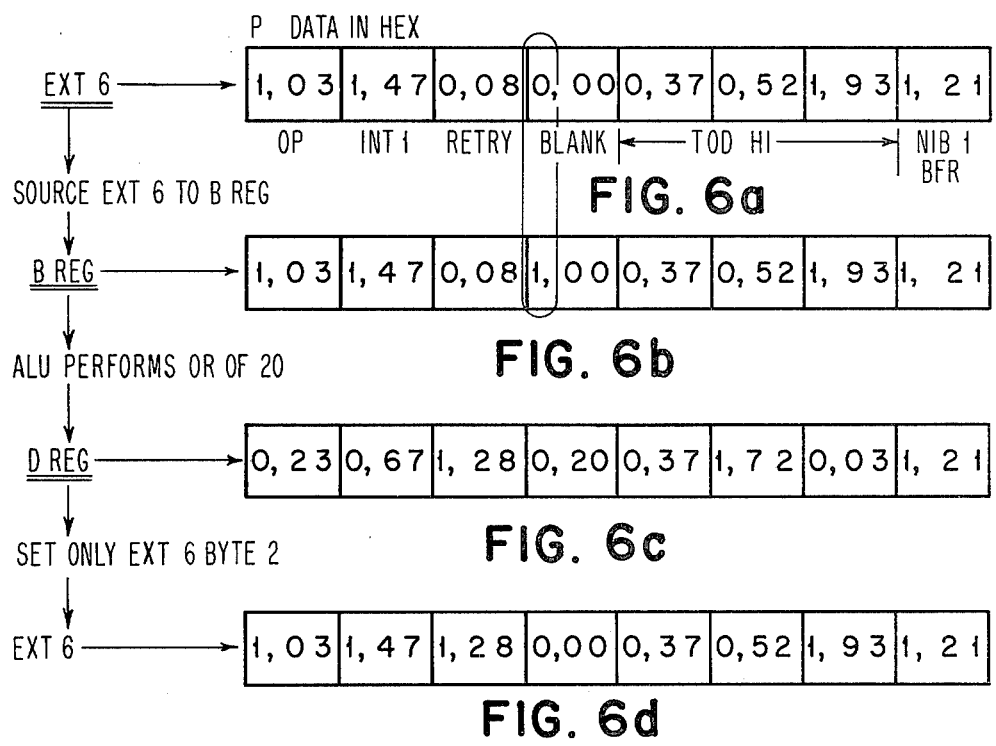
FIG. 6a
FIG. 6b
FIG. 6c
FIG. 6d

PARITY FOR COMPUTER SYSTEM HAVING AN ARRAY OF EXTERNAL REGISTERS

BACKGROUND OF THE INVENTION

1. Field of the Invention

This invention relates generally to data processing systems and more particularly to a data processing system including a computer which has an external array of registers and includes an improved capability for parity checking.

2. Description of the Prior Art

Computer systems are often designed to include a large number of hardware registers that are used as data sources and destinations. These registers may contain status, interrupt, addresses, control bits for various parts of the computer, etc. In computer systems having a multi-byte data flow, these registers may be arranged as an external array of registers for addressing purposes, for example, an M×N array of registers. This is true even though the physical registers are located at many different locations within the system. The output of the registers can be assembled and fed into an arithmetic logic unit or a shifter input register where a parity check can occur. In many instances, it is desirable that an odd parity be maintained at the register data, which parity is checked at the arithmetic logic unit input register for the purpose of detecting machine malfunctions.

The particular organization of a register array may be influenced by the performance objectives and hardware limitations with the result being that there may be unimplemented bytes in the external register array. Such an unimplemented byte in the array will cause a parity check at the check point input because it will appear to be all zeros with even parity. In order to overcome this problem, it will be necessary to provide a parity bit for each vacant or unimplemented byte in the register array.

The concepts of parity checking and parity generating are well known in the computer industry. Typical prior art patents dealing with this situation are U.S. Pat. No. 3,342,983 and U.S. Pat. No. 3,986,015, both assigned to the same assignee as the present invention. U.S. Pat. No. 3,342,983 is primarily concerned with the situation where a parity error indication does not occur even though there has been an error, or in the situation wherein error indication occurs where in fact there has been no error. Accordingly, the patent is primarily concerned with the provision of arithmetic checking apparatus for indicating errors more accurately to eliminate the erroneous parity indications. U.S. Pat. No. 3,986,015 is primarily concerned with an improved method for generating parity check bits for data bytes resulting from an operation in an arithmetic unit. It utilizes parity bit generating circuitry which works on the uncorrected data appearing at the output of, for example, an arithmetic adder, but still provides the proper parity check bits for the corrected data which represent the final output for the arithmetic unit. However, neither of these prior art patents are specifically concerned with the problem of providing parity bits for vacant or unimplemented byte locations in an array of registers.

One approach to the solution of the problem might be to provide a single bit in each vacant byte in the array of registers. However, this would provide a very inflexible register configuration and, furthermore, would make it difficult to change the array whenever an error or problem existed in one of the implemented bytes in the array. Furthermore, it would be very difficult to run diagnostic problems using such a fixed bit format.

OBJECTS AND SUMMARY OF THE INVENTION

Accordingly, it is a principal object of the present invention to provide an improved parity bit generating capability for a computer system having an external array of data registers.

It is a further object of the present invention to provide an improved parity bit generating system for a computer having an external array of data registers, wherein a bit generating capability is adapted to be provided for each byte location in the external array.

A still further object of the invention is to provide an improved parity bit generating system for a computer having an external array of data registers wherein the parity bits are generated under an initial microprogram load of the computer.

A still further object of the invention is to provide a parity bit generating system for a computer having an external array of data registers which readily permits rework and additions to the array of external registers.

Yet another object of the present invention is to provide a parity bit generating system for a computer having an external array of data registers which permits the convenient generation of diagnostic problems for the purpose of checking out the error detection circuitry of the system.

The foregoing and other objects and advantages are accomplished according to one aspect of the invention by utilizing a plurality of parity bit latches, one for each byte location in the external array of data registers. The parity bits are appropriately gated with outputs from the external array of data registers in a manner such that a parity bit will be generated and sensed to the information processing unit for each empty or unimplemented location in the array of external registers. The parity bit latches are set under an initial microprogram load of the computer system and are addressed in parallel with the array from a source addressing mechanism to generate the desired parity bits at the appropriate time. The setting of the parity bit latches may be changed under microprogram control to permit changes in the array of external registers and also to facilitate the use of diagnostic programs to generate bad parity when it is desired to check the error detection circuitry of the system.

DESCRIPTION OF THE DRAWINGS

FIGS. 2 and 3 are diagrammatic representations of two configurations of 8×8 external register arrays;

FIG. 5 is a timing diagram showing the sequence involved in modifying the "retry" external register in the external register array;

FIGS. 6a, b, c and d are sequential representations of the changes in the register location which occurs during the procedures set out in FIG. 5;

DESCRIPTION OF THE PREFERRED EMBODIMENT

The foregoing and other objects, features and advantages of the present invention will become more apparent from the following particular description of a preferred embodiment of the invention taken in conjunction with the above-described drawings.

Figure 1:
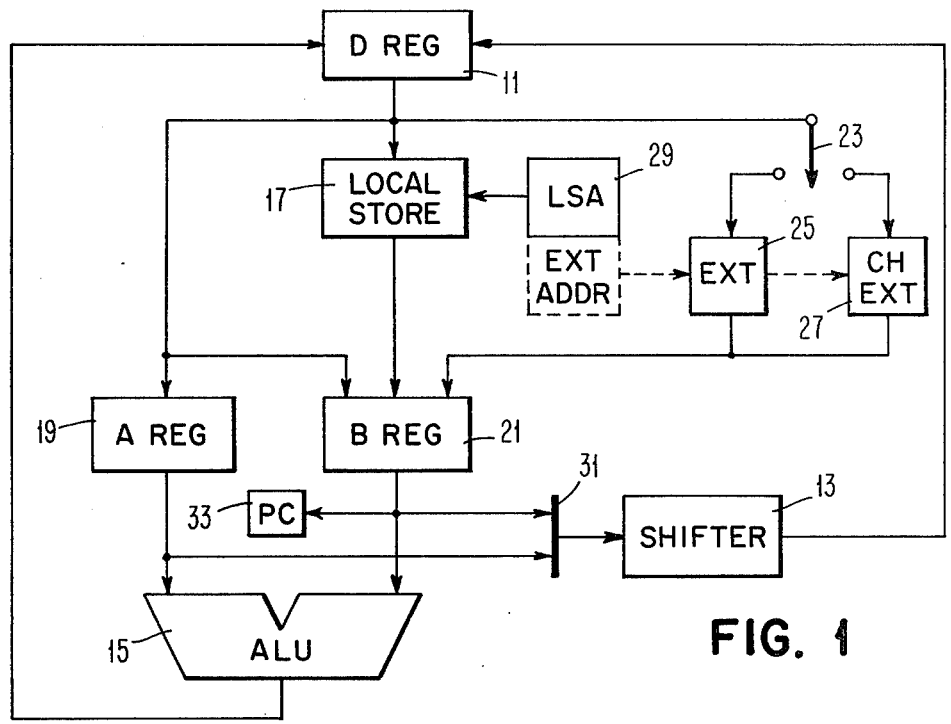
FIG. 1 is a block diagram of a portion of a computing system utilizing the concept of the present invention.

Referring first to FIG. 1, there is shown a block diagram of a portion of a computing system utilizing the concept of the present invention and including mainly the arithmetic/logical unit of a computer and its relationship with an external register array. The system includes a destination register 11 which is driven by an output from a byte shifter 13 or an output from the arithmetic logic unit 15. The output from the D register 11 is applied to the local store 17, an A register 19, a B register 21 and is gated to a switch 23. The switch 23 can be connected either to a normal external register array 25 or a channel external register array 27, the outputs from which are applied to the B register 21. A local store addressing mechanism 29 has its output feeding the local store 17 and the output from the local store is applied to the B register 21. The A register 19 and B register 21 outputs are applied to the arithmetic logic unit 15 and are also applied to an assembler 31. An output from the B register 21 is also applied to the parity checker 33.

In operation, the destination register is a multi-byte register which acts as a buffering register between the arithmetic logic unit output bus and the input path for and A and B registers 19, 21 entries to the arithmetic logic unit. In addition, the D register 11 destines the ALU output to the external register array (25 or 27), which is the principal function of the destination register in the context of the present invention. It will be recognized that the destination register in a complete system serves a number of other functions as well.

The arithmetic logic unit 15 is a multi-byte processor facility operative to perform arithmetic and logical operations on the multi-byte entries from the A register 19 and the B register 21. For the purposes of discussion, it will be assumed that the arithmetic logic unit 15 is an 8-byte processor and that the A register and B register are both 8-byte facilities. The output from the arithmetic logic unit is applied to the destination register 11 where it is saved until needed. In addition to the normal logical functions provided by the arithmetic logic unit (ALU) 15, it also detects both bit and byte carry conditions on the results of decimal operations. The ALU output bus is the bus which is normally interrogated by microcode to determine the result of both previous and current microword operations to either set or reset status conditions.

The A register 19 is used to input to the ALU and to the assembler 31. The A register 19 is set from the data in the 8-byte destination register 11, if it is specified as the destination of a microword.

The 8-byte B register 21 is used to input to the ALU and to the assembler 31. The B register is set from local store, from the external register arrays 25 and 27, or from the output of the destination register 11. The external register arrays 25 and 27 are separately addressable and controlled by microcode to provide selected inputs to the B register 21. In a normal operation, a full 8 bytes of data is provided from the external register array upon request.

The local store facility 17 contains the general purpose registers, floating point registers, trap and branch and link save areas and may include the necessary channel areas. The local store is addressed by the local store register 29 and input to the local store is from the destination register 11. The output from the local store is always destined to the B register.

The assembler 31 is an 8-byte logical assembly of the A register and the B register. The assembler is gated as specified by an executing control word that specifies that the A register contents will be gated to the assembler. When the A register is not specified to be gated to the assembler, the B register is gated to the assembler.

The parity checker 33 operates on the outputs from the B register to determine that the parity of the outputted data is correct. In the present invention we will discuss the concept of using odd parity. Therefore, if the parity checker 33 does not detect an odd parity, a machine error will be initiated. It is the purpose of the present invention to provide an external register array assembly 25 or 27 that will operate in conjunction with the B register and the parity checker 33 to always provide the desired odd parity.

FIGS. 2 and 3 are representations of the external array mapping configurations for the external array 25 or the external channel array 27 shown in FIG. 1. In the mapping, the arrays are shown as 8×8 byte arrays, each byte consisting of a parity bit and 8 data bits. For identification, the particular byte will be identified by its row and the byte number within that row. For example, in FIG. 2 the program status word one is located in row 3, byte 1. The channel storage address register is located in row 0, bytes 5, 6 and 7.

Vacant bytes are identified by an X in the array location. For example, in FIG. 2, row 4, bytes 0, 3 and 4 are vacant. The boxes which include three dashes, one under the other, indicate that the particular byte does contain intelligent data (even though it is not specifically identified).

In the example shown, FIG. 3 differs from FIG. 2 only in bytes 0 and 1 of all eight rows. This is effectively an overlay with FIG. 3 representing the channel external register array, which is identical to the regular external register array except for all of bytes 0 and all of bytes 1. Note that in FIG. 3, byte 0 of row 4 is not vacant. In order to illustrate the functioning of the present invention, it will be subsequently described how an operation is performed to change the data in the retry external register array, row 6, byte 2.

Figure 4:
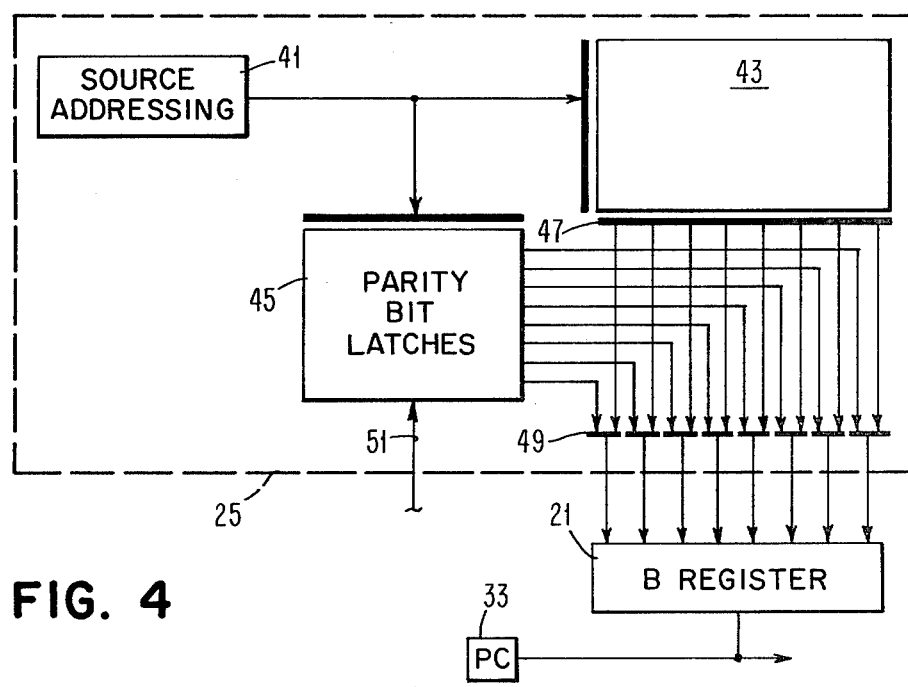
FIG. 4 is a schematic block diagram of the external array portion of a computing system according to the present invention.

Referring next to FIG. 4, there is shown a schematic circuit block diagram of an external register array and its interconnection with the B register 21 shown in FIG. 1. While this could represent either the external register array 25 or the channel external register array 27 of FIG. 1, for purposes of illustration it will be described as the external register array 25. The system consists of a source addressing mechanism 41 providing a direct input to an external register array map 43. Another output from the source addressing mechanism 41 is also applied to a plurality of parity bit latches 45, one latch for each byte in the external register array 43. The gated outputs from the external register array 43 are provided on bus 47 and are eight bytes in width. An entire row of bytes is gated out from the external register array 43 on each access command. Each of the byte outputs from the bus 47 are applied to a respective gate 49 and also applied to each of these gates 49 is a parity bit latch output from the latches 45. The outputs from the gates 49 are applied directly to the B register 21 and represent a full row being eight bytes wide. As indicated previously, one of the outputs from the B register goes to the parity checker mechanism 33.

In the context of the present invention, the parity bit latch mechanism 45 is set under the initial microprogram load from gate 51, this being operative to provide a 1 bit for each of the locations in the external register array which is vacant, invalid, inoperative, etc. This will assure that when a row of bytes is read from the external register array, any vacant or inoperative byte will at least have a 1 parity bit so that the odd parity of the system will be maintained and a machine error will not be initiated as the data passes through the B register and is checked in the parity check mechanism 33. The source addressing mechanism 41 is operative to gate on the necessary parity bit latches to generate the 1 bits as needed for a given row of bytes from the external register array. For example, if row 4 of the external register array of FIG. 2 were gated out, the parity bit latches for bytes 0, 3 and 4 would have ones generated therefor, since these bytes are vacant in this array.

FIG. 5 illustrates the timing cycles of the computer system involved in an operation on the external register arrays. Basically, two system cycles 61 and 63 each consisting of four clock pulses are required for the operation. During the first two clock pulses 65, the information to be selected from the external register array 43 is sourced. During the second clock pulse 67, the sourced material is read into the B register 21 and during the last two clock pulses of the first cycle and the first clock pulse of the second cycle 69, the arithmetic logic unit 15 will perform the desired function on the sourced information. During the first pulse 71 of the second cycle 63, the result from the ALU will be sent to the destination register 11 and then during the third pulse of the second cycle 73, the results are transferred to the appropriate location in the external register array.

FIG. 6 is a specific example of the byte configurations for a particular row of the external register array 43. This effectively corresponds to row 6 of FIG. 2. The first item in each byte location is the parity bit and the second two items of each byte are the data in hexadecimal form. FIG. 6a represents the data as it might initially exist in the external register array. FIG. 6b shows the data after it has been transferred from the external register array to the B register 21. Thus, in byte number 3, the parity bit has changed from a 0 to a 1 under the operation of the parity bit latches 45. In FIG. 6, the respective bytes are shown after a particular function has been performed by the arithmetic logic unit. In this particular case, it has been the ORing of the hexadecimal 20 to all of the data bytes in the row. FIG. 6d represents the resulting data bytes in the external register array after the operation from the destination register to the external register array has been performed.

Figure 7:
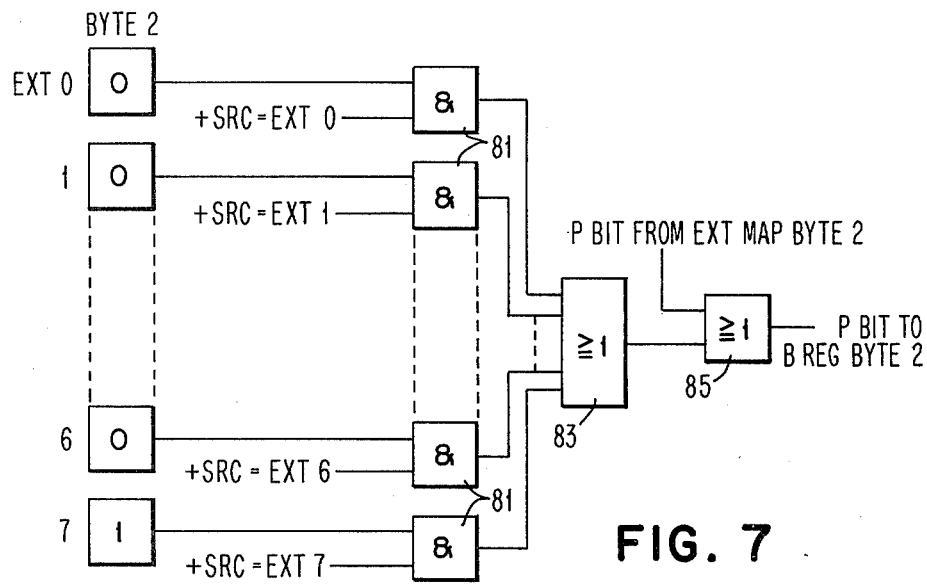
FIG. 7 is a schematic block diagram of the circuitry for byte 2 of the parity bit latch assembly of FIG. 4.
Figure 8:
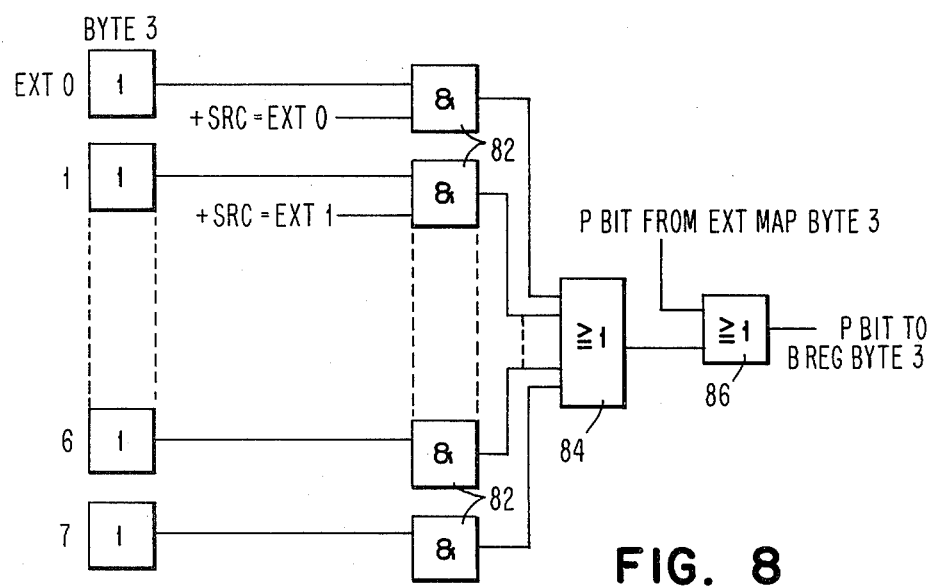
FIG. 8 is a schematic circuit diagram of the circuitry for byte 3 of the parity bit latch assembly shown in FIG. 4.

Referring next to FIGS. 7 and 8, therein is shown the setting of bytes 2 and 3 of the parity bit latch array under initial microprogram load of an external register array as shown in FIG. 2. As earlier described under initial microprogram load, if a byte of the external register array contains data, then a zero will be entered into its corresponding parity bit latch in the parity bit latch array 45. Accordingly, for all of the 2 bytes in rows 0 through 6 of the external register array illustrated in FIG. 2, zeros will be shown in the respective parity bit latch array locations. However, for row 7, byte 2, a one is shown since this byte is empty. Each of the bits corresponding to the parity bit latch for their respective array is applied to an AND gate 81. Also applied to the gate 81 is a source pulse derived from the source addressing mechanism 41. All of the outputs from the AND gates 81 are applied to an OR gate 83, the output from which is applied to a second OR gate 85 which also includes a gated parity bit from the externally mapped array of registers. The output from the OR gate 85 is applied to the B register parity bit location as exemplified in FIG. 4.

Since all of bytes 3 in column 0 through 7 are vacant, the parity bit latch array for this column is as represented in FIG. 8 with ones in all of the latch locations. This uses the same combination of AND gates and OR gates as described above for FIG. 7. Accordingly, any time any row is actually sourced by the system from the external array of registers, a 1 bit will always be forced into the parity location corresponding to the byte 3 of the particular row selected.

In order to illustrate the specific functioning of the invention, the following description is given of the manner in which the code will implement a turn on of bit number 2 in the retry external register; that is, to change the 2 bit from a 0 to a 1. As shown in FIG. 6a, the hexadecimal representation of the data in the retry byte register is 08 which corresponds in binary form to the designation 0000 1000. The function then will be to change this to a hexadecimal 28 which corresponds in binary form to 0010 1000. As noted in FIG. 6a and in FIG. 2, the problem that will be solved is how to provide odd parity for byte 3 in row 6 which is blank and therefore has the hexadecimal representation of 00 and the binary representation of 0000 0000 with a 0 bit in the parity bit. Since the ALU will perform the ORing function to all of the bytes in the selected row, the parity bit must be added to byte number 3 of row 6 before it is transferred to the B register or else a false parity will be detected, indicating a machine error. As can be seen in FIG. 6, all of the other bytes of row 6 will have the proper odd parity to pass through the parity check mechanism.

In performing the above-described operation, the retry array register is sourced by first selecting all of row 6 of the external register array 43. Concurrently, the source addressing mechanism 41 will activate the parity bit latches in the array 45 for row 6. As shown in FIGS. 7 and 8, the parity bit for byte 2 of row 6 is a 0 and the parity bit for byte 3 of row 6 is a 1. Accordingly, nothing will be passed through the AND gate 81 for byte 2 and an AND bit will not be forced from the parity bit latch mechanism 45 for byte 2. However, for byte 3, the 1 parity bit for row 6 is gated to the AND gate 82 and at a corresponding time the source pulse is applied to the other input to the AND gate which will make an AND function and force a parity bit to the input of OR gate 84. As shown in FIG. 5, this occurs during the first clock pulse 65 of the first system cycle 61. As shown in FIG. 8, the 1 parity bit from gate 84 is applied to the input of the OR gate 86 which will provide a positive parity bit to the B register for byte 3. As illustrated in FIG. 7, since the retry byte, byte 2, already has an odd parity, there is no need for a positive parity bit from the external register array and, accordingly, no parity bit is sent to the B register for byte 2.

With the foregoing operation, it is assured that the odd parity bit check will take place in the parity check mechanism 33 for all of the bytes from row 6 of the external register array 25 (47). As indicated further in FIG. 5, during the second clock pulse 67 of the first system cycle 61, the external row 6 from the external register array 43 is set into the B register and will appear as shown in FIG. 6b. Here it is noted that the parity bit for the blank byte is changed from a 0 to a 1 to give the proper odd parity check. In order to turn on bit 2 in the retry external register, the ALU will then perform an OR function the hexadecimal 20 which corresponds to a binary 0010 0000 which function is initiated at the beginning of clock pulse 2 in the first system cycle and takes it up through the end of clock pulse 0 of the second system cycle 63. After ORing the hexadecimal 20 to all of the bytes in row 6, the corresponding representation is found in FIG. 6c. At the beginning of the 0 clock pulse 71 of the second system cycle 63, the results from the arithmetic logic unit 15 are applied to the destination register 11. This again is the configuration shown in FIG. 6c. Based upon the previous inputs received, the destination register outputs only the updated retry byte array and writes this over the data existing in the external register array 25. This will be as shown in FIG. 6d now having a hexadecimal representation 28.

Referring to FIGS. 7 and 8, it can be seen that the AND gates 81, 82 are activated only when there is a corresponding source pulse from their respective external register array rows. For example in FIG. 7, when row 6 is activated, a plus source pulse is applied from external row 6 to an AND gate 81 corresponding thereto. However, there is no pulse source pulse applied to the input to the AND gate for external array row 7, since this row has not been activated. Therefore, even though a plus 1 parity bit exists in the row 7, byte 2 configuration, there will be no output from its corresponding AND gate and consequently there will be no parity bit outputs from OR gates 83 or 85 with the given configuration.

With the foregoing system description, it is quite clear that a vastly improved external register array configuration has been provided. The various registers in the array can be modified as needed and the correct parity will be maintained by providing the appropriate parity bit in the respective byte locations for the registers in the array. Furthermore, if an array register becomes defective, which effectively makes it a blank register, the system need not be shut down if the register is not essential to system operation, since it is only necessary to provide a positive parity bit in its corresponding parity bit latch array. Furthermore, erroneous parity bits can be entered into the parity bit latch array when doing a system test to make sure that the parity bit checking mechanism is functioning properly.

From the foregoing, it is readily apparent that applicants have provided an improved parity mechanism for a computer system having an array of external registers. Using this concept, the system has extremely good flexibility in the implementation of external register arrays and additionally provides a mechanism to facilitate system tests. It will be obvious to those skilled in the art that various modifications and changes can be made to the foregoing particular description without departing from the spirit or scope of the invention. Accordingly, it is intended that the invention not be limited to the specifics of the foregoing description of the preferred embodiment, but rather as to embrace the full scope of the appended claims.

Having thus described our invention, what we claim as new, and desire to secure by Letters Patent is:

1. In a data processing system including an information processing unit utilizing an odd parity check for detecting machine malfunctions, and a plurality of external byte wide registers electrically connected into an M×N array, said array having a number of unusable registers whereby the number of usable registers is less than M times N, thereby leaving unimplemented bytes in the array of registers, means for implementing a parity bit for each of said unimplemented bytes in the array of registers, said means comprising:
   a plurality of parity bit generating devices mapped to the configuration of said array of external registers, each bit generating device upon activation providing a parity bit for its respective external register location; and
   means for selectively activating said plurality of parity bit generating devices to activate those, and only those, devices corresponding to the unimplemented bytes in said array of external registers.

2. The invention according to claim 1 wherein unimplemented bytes include empty bytes and disabled bytes.

3. The invention according to claim 1 wherein said plurality of bit generating devices is an M×N array of latches each adapted upon activation to provide a parity bit.

4. The invention according to claim 1 wherein said means for selectively activating includes means for controlling said plurality of parity bit generating devices by a microprogram.

5. The invention according to claim 1 additionally comprising means to access said plurality of external byte wide registers one row at a time.

6. The invention according to claim 1 additionally comprising a source addressing mechanism operative to access selected ones of said plurality of external byte wide registers.

7. The invention according to claim 6 wherein said source addressing mechanism includes means operative to activate a plurality of bit generating devices corresponding to unimplemented bytes in said selected ones of said plurality of byte wide registers.

8. The invention according to claim 6 wherein said source addressing mechanism is operative to source a row at a time from said array of external registers.

9. In a data processing system including an information processing unit utilizing an odd parity check for monitoring system performance, an external register array subsystem comprising:
   a plurality of external registers electrically connected into an M×N array, said array having a number of unusable registers, whereby the number of usable external registers can equal less than M times N, thereby leaving unimplemented register locations in the array of registers;
   a plurality of M times N parity bit generating devices mapped to the configuration of said array of external registers, each bit generating device adapted upon activation to provide a parity bit for its respective external register location;
   means for selectively setting those parity bit generating devices corresponding to unimplemented register locations in said array of registers, thereby permitting said selected devices to be activated upon being sourced;

means for providing outputs from said external registers to said information processing unit; means for providing outputs from said parity bit generating devices to said information processing unit; and source addressing means operative to selectively access a first plurality of said external register locations and to activate any parity bit generating devices corresponding to unimplemented locations in said first plurality of external register locations, whereby selected outputs from said array and parity bits from said devices are logically combined and provided to said information processing unit.

10. The invention according to claim 9 wherein said means for selectively setting those parity bit generating devices corresponding to unimplemented register locations includes program responsive means operative in response to an initial program load to selectively set said parity bit generating devices.

11. The invention according to claim 9 wherein said registers are one byte wide and wherein unimplemented registers include empty locations and disabled registers.

12. The invention according to claim 9 wherein said external registers are sourced one row at a time.

13. The invention according to claim 9 wherein said information processing unit includes at least first and second registers connected to receive inputs signals and an arithmetic logic unit connected to receive outputs from said first and second registers, a parity checking mechanism, said second register additionally providing an output to said parity checking mechanism, whereby data passing through said second register is checked for odd parity.

14. The invention according to claim 13 wherein said means for providing outputs from said external registers to said information processing unit comprises means for providing outputs from said external registers to said second register in said information processing unit.

15. The invention according to claim 14 wherein said means for providing outputs from said parity bit generating devices to said information processing unit comprises means for combining said outputs from said parity bit generating devices with said outputs from said external registers to be provided to said second register in said information processing unit.

* * * * *